United States Patent
Jung

(10) Patent No.: US 6,980,802 B2
(45) Date of Patent: Dec. 27, 2005

(54) HANDOVER METHOD FOR MOBILE STATION HAVING MOBILE IP ADDRESS IN MOBILE COMMUNICATION SYSTEM

(75) Inventor: Tae-Sung Jung, Sangju-shi (KR)

(73) Assignee: Samsung Electronics Co., Ltd., (KR)

( * ) Notice: Subject to any disclaimer, the term of this patent is extended or adjusted under 35 U.S.C. 154(b) by 577 days.

(21) Appl. No.: 10/035,466

(22) Filed: Oct. 26, 2001

(65) Prior Publication Data

US 2002/0086674 A1    Jul. 4, 2002

(30) Foreign Application Priority Data

Oct. 26, 2000    (KR) ................................ 2000-63236

(51) Int. Cl.[7] ................................................ H04Q 7/20
(52) U.S. Cl. ..................... 455/436; 455/445; 455/439; 370/382; 370/351
(58) Field of Search ............................... 455/436, 445, 455/433, 435.1, 435.2, 552.1, 432.1, 426; 370/332, 351, 313, 356, 409, 466, 338, 352, 370/353, 401; 709/241, 245

(56) References Cited

U.S. PATENT DOCUMENTS 6,160,804 A * 12/2000 Ahmed et al. .............. 370/349
6,195,705 B1 * 2/2001 Leung ........................ 709/245
6,466,964 B1 * 10/2002 Leung et al. ............... 709/202
6,487,406 B1 * 11/2002 Chang et al. ............. 455/422.1
6,578,085 B1 * 6/2003 Khalil et al. ................ 709/241
6,594,498 B1 * 7/2003 McKenna et al. .......... 455/517
6,711,147 B1 * 3/2004 Barnes et al. ............... 370/338

OTHER PUBLICATIONS

European Search Report dated may 27, 2003 issued in a counterpart application, namely Appln. No. 01125664.1.
Perkins et al.,"Route Optimization in Mobile IP", Feb. 2000.
Perkins, IP Mobility Support, Oct. 1996.
Montenegro, "Reverse Tunneling For Mobile IP", May 1998.

* cited by examiner

Primary Examiner—Danh Cong Le
(74) Attorney, Agent, or Firm—Dilworth & Barrese LLP

(57) ABSTRACT

There is provided a handover method for a mobile node (MN) having a mobile IP (Internet Protocol) address in a mobile communication system. When a handover occurs as the MN moves from the area of a first FA to the area of a second FA adjacent to the first FA, the second FA transmits a Binding Update message including the IP address of the second FA and an acknowledgement request to the first FA. In response to the Binding Update message, the first FA transmits a Binding Acknowledge message to the second FA, including a field indicative of the IP tunneling capability of a router connected to a corresponding node (CN) to which the MN connects a call.

9 Claims, 4 Drawing Sheets

HANDOVER METHOD FOR MOBILE STATION HAVING MOBILE IP ADDRESS IN MOBILE COMMUNICATION SYSTEM

PRIORITY

This application claims priority to an application entitled "Handover Method for Mobile Station Having Mobile IP Address in Mobile Communication System" filed in the Korean Industrial Property Office on Oct. 26, 2000 and assigned Serial No. 2000-63236, the contents of which are hereby incorporated by reference.

BACKGROUND OF THE INVENTION

1. Field of the Invention

The present invention relates generally to a handover method in a mobile communication system, and in particular, to a handover method for a mobile station having a mobile IP address.

2. Description of the Related Art

Handover is implemented to ensure mobility for a mobile station and continue communications without interruption. The handover maintains a call and changes a source base station to a target base station without being noticed by a user. The mobile station continues the call, performing a control operation as the target base station becomes its serving base station. The handover is categorized into a soft handover and a hard handover. The Soft handover occurs with simultaneous channel assignment to two base stations, whereas the hard handover connects a channel to a target base station, releasing an established channel from a source base station.

Research has actively been made on assignment of a mobile IP (Internet Protocol) address to a mobile station to reliably provide an Internet service, a voice service and other data services, while ensuring mobility for the mobile station. With a mobile IP address assigned to a mobile station, the mobile station can receive services in other countries, such as the U.S., although the mobile station is registered in a home country, such as Korea. The mobile communication system is provided with a home agent (HA) to locate the mobile station, and a base station or a base station controller in another area acts as a foreign agent (FA). When the mobile station is located in another area, it registers its location in the FA and transmits the address of the HA as well as its registration and other information to the FA. The HA stores the location information of the mobile station, that is, the address of the FA, to thereby perform location registration for the mobile station.

The mobile station can then communicate through the FA. A corresponding node (CN) with which the mobile station communicates, whether it is a mobile station or a system (host), transmits/receives data over an IP network. To transmit data to the mobile station, the CN transmits the data to HA through a predetermined router, such as, an edge router connected to the IP network. The router then transmits data received from CN for the mobile station to the HA. The HA sends the data to the FA using the address stored during the location registration. Thereafter, the router becomes a node in a transmission path in which the CN transmits data to the mobile station through the HA. Meanwhile, since the FA can detect the address of the edge router, the CN can receive data directly from the FA. Therefore, a reception path from the FA to the CN is directly connected to the edge router. In this case, the transmission path is different from the reception path.

Alternatively, if mobile station wants to transmit some data to a CN, the mobile station transmits data simply to CN through FA by IP packet routing in the routers. When the mobile station receives data from the CN, the data will be also transmitted by IP packet routing in the routers.

Even when a data tranmission path is connected between the mobile station and a particular terminal in this manner, data is exchanged between the router connected to the CN and the FA of the mobile station by IP tunneling.

The mobile station may move to another FA without staying in one FA because it has mobility. In some cases, a reliable handover by IP tunneling cannot be implemented for the mobile station. More specifically, if the mobile station moves to a second FA with a data transmission path connected to a first FA, its location registration must be performed again. Then, the first FA hands over the data to the second FA. Here, the first FA is in the state where it transmits/receives data to/from the router connected to the CN by IP tunneling. However, there is no way for the first FA to notify the second FA that data can be exchanged between the CN and the second FA by IP tunneling, thereby impeding active handover implementation.

SUMMARY OF THE INVENTION

It is, therefore, an object of the present invention to provide a method of actively implementing a handover when a mobile station having a mobile IP address connects a data transmission path through an IP network in a mobile communication system.

It is another object of the present invention to provide a method of implementing a handover actively when a mobile station having a mobile IP address is not located within the area of an HA.

The foregoing and other objects of the present invention are achieved by providing a handover method for a mobile node (MN) having a mobile IP (Internet Protocol) address in a mobile communication system. A first foreign agent (FA) wirelessly communicates with the MN in the area where the MN is located, a home agent (HA) registers the location of the MN, a router is connected to the HA, and a corresponding node (CN) is connected to the router, for communicating with the MN in the mobile communication system. When the router can perform IP tunneling with the first FA, the router transmits IP tunneling information to the first FA through the HA. When a handover occurs as the MN moves from the area of the first FA to the area of the second FA adjacent to the first FA, the second FA transmits a Binding Update message including the IP address of the second FA and an acknowledgement request to the first FA. In response to the Binding Update message, the first FA transmits a Binding Acknowledge signal to the second FA, including a field indicative of the IP tunneling capability of the router.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
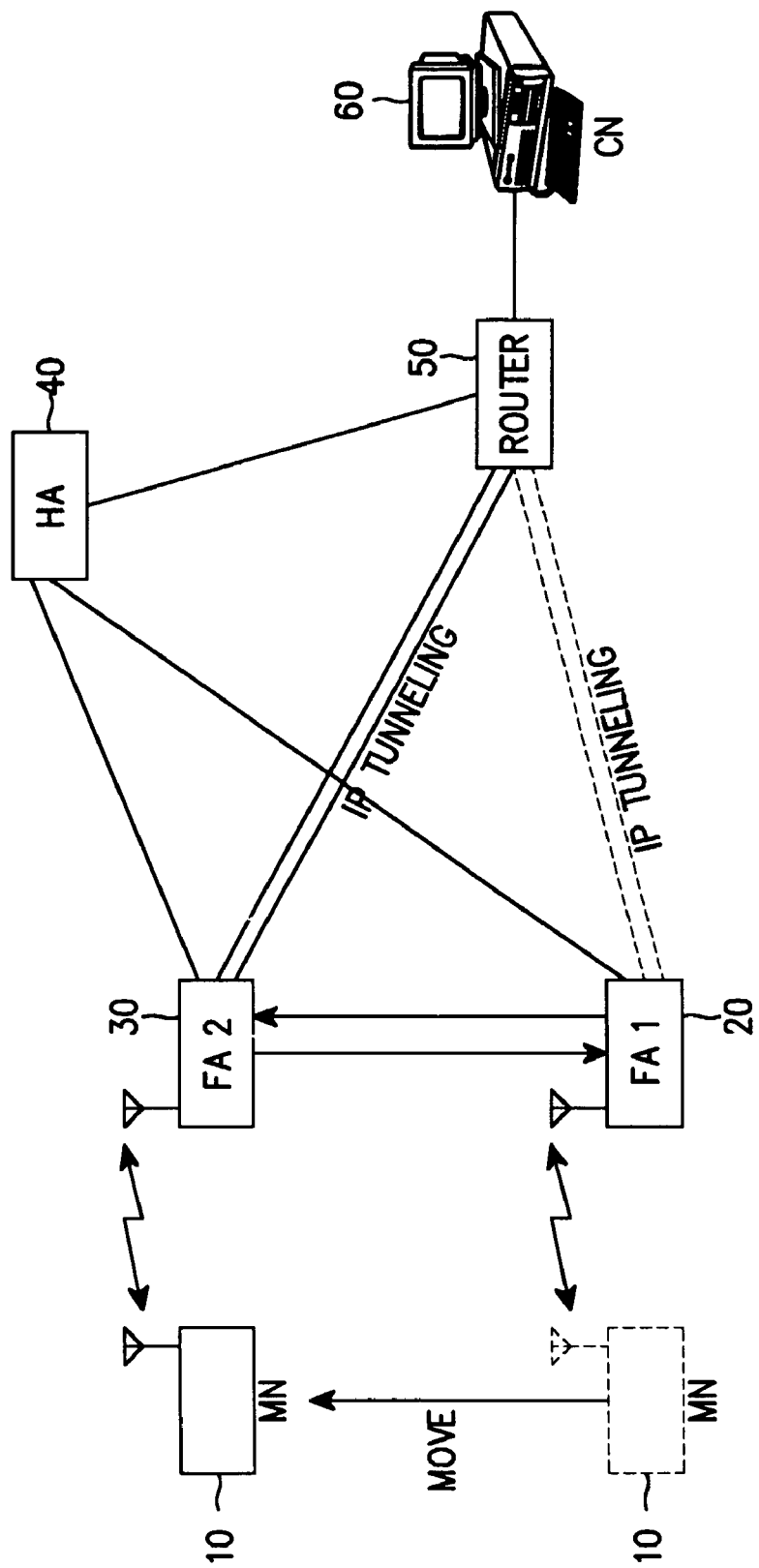
FIG. 1 illustrates a network configuration where a handover occurs as a mobile node (MN) having a mobile IP address moves to the area of another FA with a data transmission path established between the MN and a first FA in a mobile communication system according to the present invention.

FIG. 1 illustrates a network configuration where a handover occurs as an MN having a mobile IP address moves to the area of another FA with a call established between the MN and an FA in a mobile communication system according to the present invention. There will be given a description on the operation of each node in the network and a handover procedure when an MN having a mobile IP address conducts a data transmission/reception in the area of an FA in the mobile communication system according to the present invention.

Figure 2:
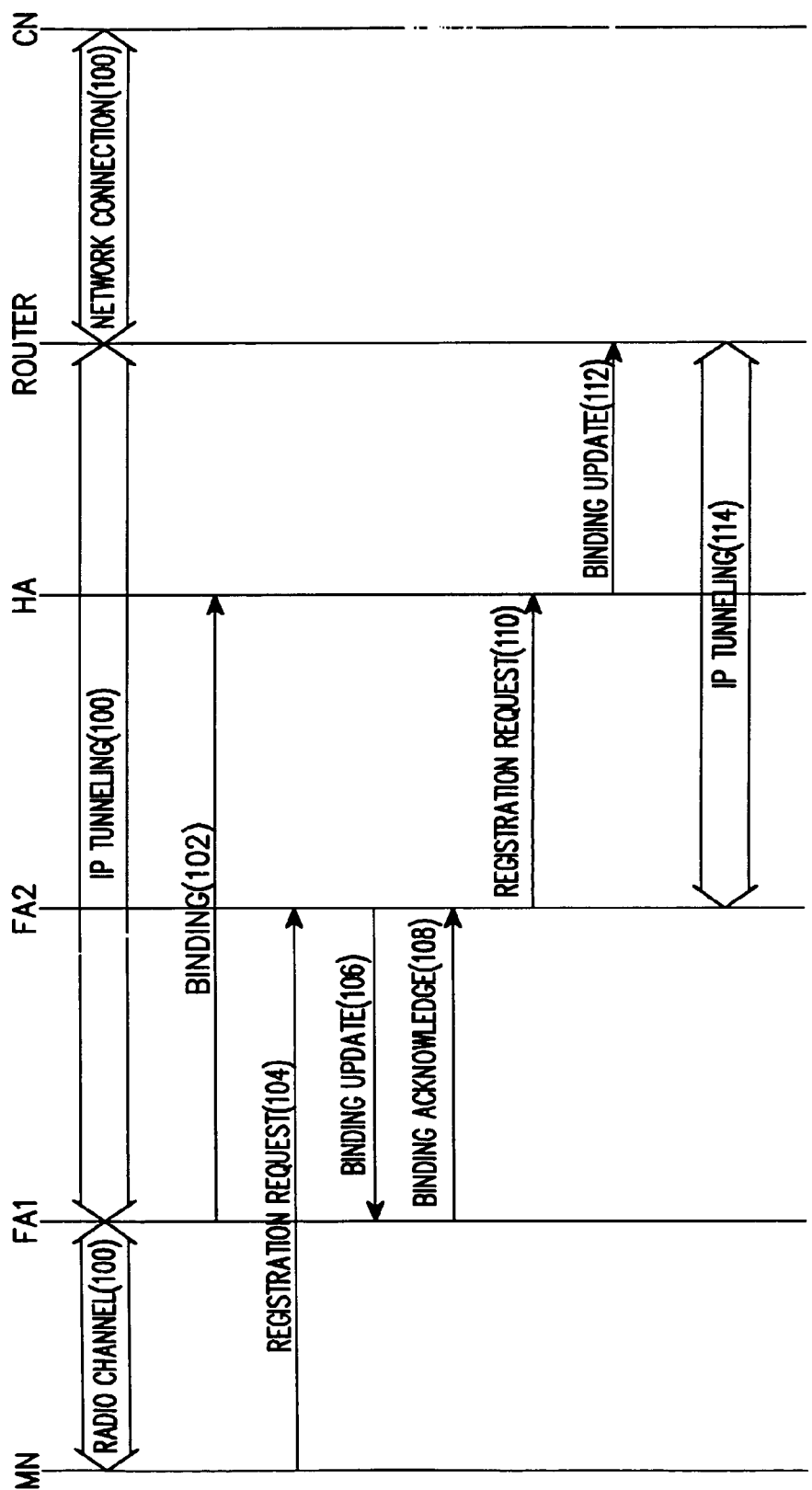
FIG. 2 is a diagram illustrating a signal flow for a handover according to the present invention.

Referring to FIGS. 1 and 2, an MN (10) has a mobile IP address and is capable of communicating in another foreign area as well as in the area of an HA (40). If the MN (10) is located in another area, it additionally transmits the address of its HA to a corresponding FA by a typical location registration message, thereby registering its location. FAs to which the MN (10) can register its location in areas other than the area of the HA, FA1 (20) and FA2 (30) are wirelessly connected to the MN 10. The FAs 1(20) and 2(30) can be connected to an HA (40) for transmission of a location registration signal. The FAs 1(20) and 2(30) can also transmit/receive data over an IP network. That is, they can transmit data capsulated by an IP protocol and decapsulate received capsulated data. The HA (40) receives the position information of the MN (10), and upon receipt of a data transmission request from a particular node, provides the location information or controls data transmission/reception connection.

Location registration in the network configuration shown in FIG. 1 will now be described. When it is located within the area of the FA1(20), the MN (10) generates a Registration Request signal 104 and transmits the Registration Request signal 104 together with the address of the HA (40) to the FA1(20). Then, the FA1(20) checks the address of the HA (40) included in the Registration Request signal 104 and requests location registration to the HA (40) according to the received address of the HA (40). For the location registration, the FA1(20) also transmits its own address to the HA (40). The HA (40) stores the information about the present location of the MN 10 and the location registration is performed in response to the location registration request.

The operation of each node and a signal flow when a handover occurs according to the present invention will be described below referring to FIGS. 1 and 2.

If the MN (10) requests a data transmission to a CN (60) after the location registration, the FA1 (20) transmits a data transmission path set-up request signal to a router (50) connected to the CN (60). The router (50) requests a call to the CN (60) based on the received address. If the CN responds to the data transmission request, a data transmission path is established between the MN (10) and the CN (60). The data transmission connection occurs in step 100. Here, the MN is wirelessly connected to the FA1 (20), which is connected to the router (50) by IP network. The router (50) is connected to the CN (60) through a predetermined network.

When the MN (10) moves to the area of the FA2 (30), the FA1 (20) transmits a Binding Warning message 102 to the HA (40), notifying that the MN (10) is out of the area of the FA1 (20). That is, as the MN 10 roams out of the area of the FA1 (20) during step 100 in progress, step 102 is performed. Referring to FIG. 1, the MN (10) moves from the location marked by a dotted line, that is, from the area of the FA (20) to the area of the FA (30). In step 104, the MN (10) requests location registration wirelessly to the FA (30) by a Registration Request message. Upon receipt of the Registration Request message, the FA2 (30) transmits a Binding Update message 106 to the FA1 (20), notifying FA1 (20) that the MN (10) has moved to the area of the FA 2(30) in step 106. The Binding Update message according to the present invention is shown in FIG. 3A.

Figure 3A:
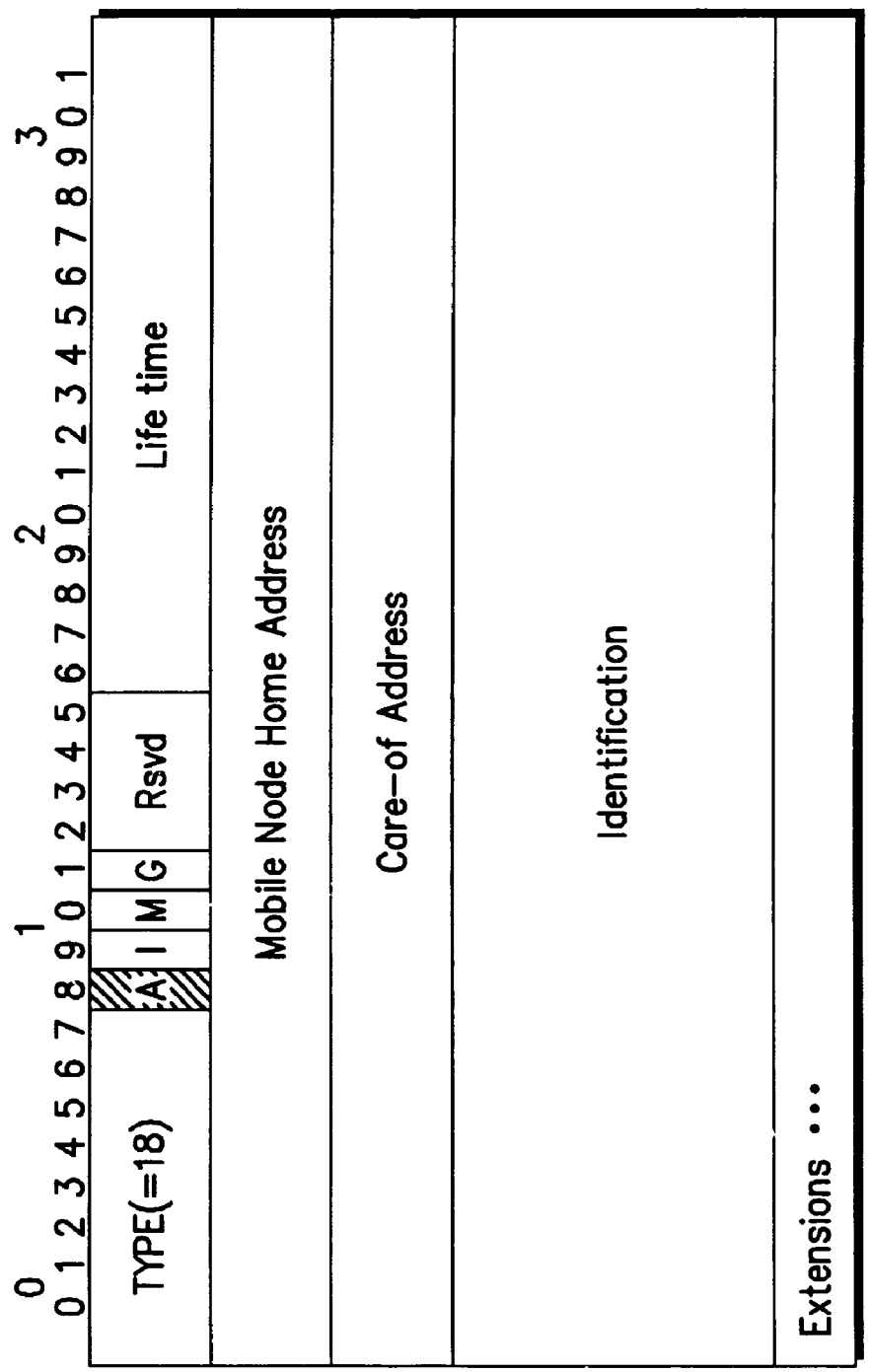
FIG. 3A illustrates the structure of a Binding Update message between FAs according to the present invention.

FIG. 3A illustrates the structure of the Binding Update message transmitted between FAs according to the present invention. Referring to FIG. 3A, the Binding Update message is composed of Type, Life time (i.e., a field indicating how long the MN (10) is registered), Mobile Node Home Address, Care-of Address (i.e., the address of the FA2 (30)), and an ID (identification). The Binding Update message further includes especially an acknowledgement requesting message field, A (Acknowledge). The acknowledgement requesting message field A is used to receive a signal from the FA1 (20), indicating whether IP tunneling is to be established or not.

Figure 3B:
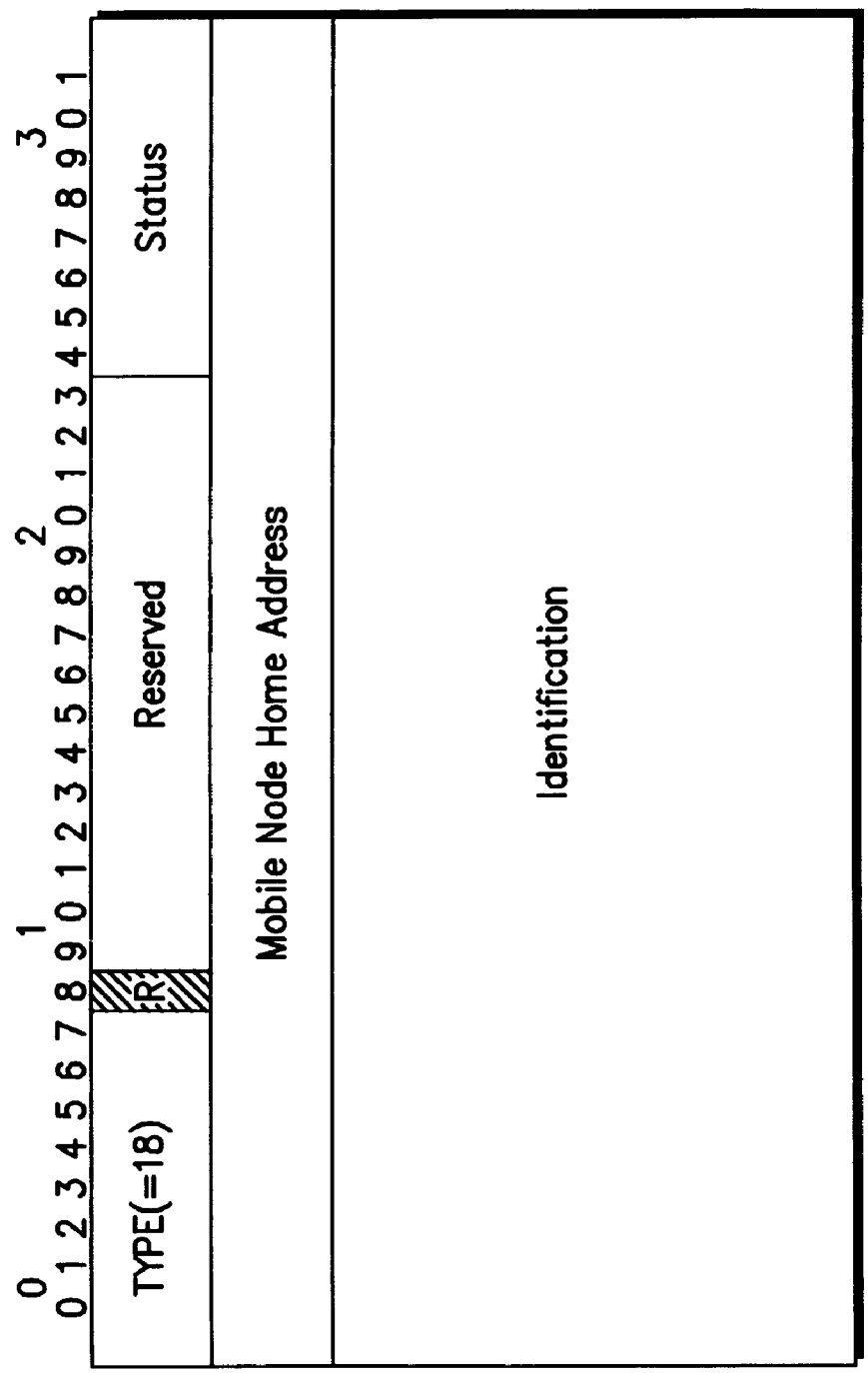
FIG. 3B illustrates the structure of a Binding Acknowledgement message for the Binding Update message received from an FA according to the present invention.

Upon receipt of the Binding Update message, the FA1(20) transmits a Binding Acknowledge message 108 including data transmitting/receiving-related information to the FA2 (30) in step 108. The Binding Acknowledge message 108 is illustrated in FIG. 3B. FIG. 3B illustrates the structure of the Binding Acknowledge message as an acknowledgement message for the Binding Update message received from the FA2 (30) according to the present invention.

Referring to FIG. 3B, the Binding Acknowledge message 108 includes Type and a field R indicating the capsulation capability of the router (50) connected to the CN (60). The Binding Acknowledge message 108 further includes Status, Mobile Node Home Address, and ID. Specifically R bit is used for IP tunneling between FA and the router connected to CN. HA transmits IP data to FA by forward tunneling. And, FA tranmits IP data to CN by a normal IP routing path. However, when FA1 transmits IP data by backward tunneling to router connected to CN directly, FA2 also must transmit by backward tunneling method. But, FA2 does not know if FA1 transmits IP data by backward tunneling method. So, FA1 must inform the method to FA2. R bit is used when FA1 informs its tunneling method to FA2. Preferably, the field R is set to 1 when the CN has capsulation capability and to 0 when the CN has no capsulation capability.

Upon receipt of the Binding Acknowledge message, 108 the FA (30) prepares to communicate with the CN (60) and transmits a Registration Request message 110 to the HA (40) in step 110. The HA (40) transmits a Binding Update message 112 to the router (50) connected to the CN (60) in step 112. Thus, the router (50) prepares to communicate data with the FA2 (30) and data is exchanged between the FA2 (30) and the router (50) by IP tunneling in step 114. It is to be noted here that the channel established in step 100 is still maintained between the router (50) and the CN (60). Therefore, when IP tunneling is formed between the FA2 (30) and the router (50), communication is available between the MN (10) and the CN (60) and a handover occurs from the FA1 (20) to the FA2 (30).

As described above, the present invention is advantageous in that use of a Binding Update message requesting an acknowledgement and a Binding Acknowledge message enables active implementation of a handover in a mobile communication system even when an MN having a mobile IP address communicates in the area of an FA, that is, not in the area of an HA.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method in an mobile communication system that includes a mobile node (MN) having a mobile IP (Internet Protocol) address, a first foreign agent (FA) for wirelessly communicating with the MN in the area where the MN is located, a home agent (HA) for registering the location of the MN, a router connected to the HA, and a corresponding node (CN) connected to the router for communicating with the MN for performing IP tunneling with the first FA, the router transmitting IP tunneling information to the first FA through the HA, the method comprising the steps of:

transmitting a Binding Update message including the IP address of a second FA and an acknowledgement request to the first FA by the second FA, when a handover occurs as the MN moves from the area of the first FA to the area of the second FA adjacent to the first FA; and transmitting a Binding Acknowledge message including a information of the IP tunneling capability of the router to the second FA in response to the Binding Update message by the first FA.

2. The handover method of claim 1, further comprising the step of registering the location information of the MN to the second FA wirelessly communicating with the MN during the handover.

3. The handover method of claim 1, further comprising the step of transmitting a Binding Warning message to the HA by the first FA during the handover.

4. The handover method of claim 1, further comprising the step of updating the location information of the MN by transmitting a Registration Request message to the HA by the second FA after receiving the Binding Acknowledge message.

5. The handover method of claim 4, further comprising the step of transmitting the Binding Update message to the router by the HA to notify the router of movement of the MN when the location information of the MN is updated.

6. The method of claim 1, further comprising the step of:
   after transmitting the Binding Acknowledge message to the target FA releasing an established IP tunnel between the source FA and a corresponding node (CN).

7. The handover method of claim 6, further comprising the steps of:

transmitting a Binding Update message to a source FA upon receipt of a Registration Request message from the MN requiring a handover; and establishing a radio channel between the MN and the target FA and exchanging data on a radio channel.

8. The handover method of claim 1, wherein the Binding Update Acknowledge message comprises type information (Type), a field R indicating the capsulation capability of a router connected to the CN to which the MN connects a call, a status field (Status), the home address of the MN (Mobile Node Home Address), and ID.

9. The handover method of claim 1, wherein the Binding Update message comprises type information (Type), a field indicating the time period for which the MN is registered (Life time), Mobile Node Home Address, the address of the target FA (Care-of Address), ID, and an acknowledgement requesting message field A.

* * * * *